United States Patent
In

(10) Patent No.: US 11,132,980 B2
(45) Date of Patent: Sep. 28, 2021

(54) DRIVING CHIP, DISPLAY DEVICE, AND METHOD OF DRIVING DISPLAY DEVICE

(71) Applicant: Samsung Display Co., Ltd., Yongin-Si (KR)

(72) Inventor: Hai Jung In, Yongin-si (KR)

(73) Assignee: Samsung Display Co., Ltd.

( * ) Notice: Subject to any disclaimer, the term of this patent is extended or adjusted under 35 U.S.C. 154(b) by 0 days.

(21) Appl. No.: 16/997,851

(22) Filed: Aug. 19, 2020

(65) Prior Publication Data

US 2021/0090524 A1 Mar. 25, 2021

(30) Foreign Application Priority Data

Sep. 19, 2019 (KR) ........................ 10-2019-0115264

(51) Int. Cl.
  *G09G 5/10* (2006.01)
  *G06K 9/00* (2006.01)
  *G09G 3/20* (2006.01)

(52) U.S. Cl.
  CPC ............ *G09G 5/10* (2013.01); *G09G 3/2003* (2013.01); *G06K 9/0004* (2013.01); *G09G 2300/0828* (2013.01); *G09G 2310/027* (2013.01); *G09G 2310/08* (2013.01); *G09G 2360/14* (2013.01)

(58) Field of Classification Search
  CPC .................. G09G 5/10; G09G 3/2003; G09G 2300/0828; G09G 2310/027; G09G 2310/08; G09G 2360/14; G06K 9/0004
  See application file for complete search history.

(56) References Cited

U.S. PATENT DOCUMENTS

| | | | |
|---|---|---|---|
| 7,643,035 B2 * | 1/2010 | Toyama | G06T 5/007 345/589 |
| 10,157,562 B2 | 12/2018 | Shin et al. | |
| 10,403,214 B2 * | 9/2019 | Baar | G09G 3/3406 |
| 2009/0096731 A1 * | 4/2009 | Woo | G09G 3/3688 345/87 |
| 2013/0113842 A1 * | 5/2013 | Hwang | G09G 3/204 345/690 |
| 2013/0147864 A1 * | 6/2013 | Kim | G09G 3/3406 345/691 |

(Continued)

FOREIGN PATENT DOCUMENTS

| KR | 10-2018-0037919 A | 4/2018 |
|---|---|---|
| KR | 10-2018-0092055 A | 8/2018 |

(Continued)

*Primary Examiner* — Ricardo Osorio
(74) *Attorney, Agent, or Firm* — Innovation Counsel LLP

(57) ABSTRACT

A display device includes a display unit comprising a plurality of pixels disposed in a display area, the display area comprising a first area and a second area; a gamma voltage supply including gamma voltage generators that are configured to generate respective ones of gamma voltage sets; and a data driver configured to convert image data into data signals using the gamma voltage sets, supply the data signals to the pixels, generate the data signals corresponding to the first area and the second area using a first group comprising some of the gamma voltage generators in a first mode, and generate the data signals corresponding to the second area using a second group comprising different gamma voltage generators from the first group in a second mode.

17 Claims, 12 Drawing Sheets

(56) References Cited

U.S. PATENT DOCUMENTS

| | | | |
|---|---|---|---|
| 2015/0070406 A1* | 3/2015 | Baek | G09G 3/3406 |
| | | | 345/690 |
| 2015/0339967 A1* | 11/2015 | Shin | G09G 3/3406 |
| | | | 345/690 |
| 2018/0220101 A1* | 8/2018 | Evans | H04N 7/0117 |
| 2018/0300526 A1 | 10/2018 | Cho et al. | |
| 2019/0057660 A1 | 2/2019 | Lee et al. | |
| 2019/0065808 A1 | 2/2019 | Zhang et al. | |
| 2019/0197944 A1* | 6/2019 | Kim | G09G 3/30 |
| 2021/0027745 A1* | 1/2021 | Bai | G09G 5/14 |

FOREIGN PATENT DOCUMENTS

| | | |
|---|---|---|
| KR | 10-2018-0117003 A | 10/2018 |
| KR | 10-2019-0019676 A | 2/2019 |

* cited by examiner

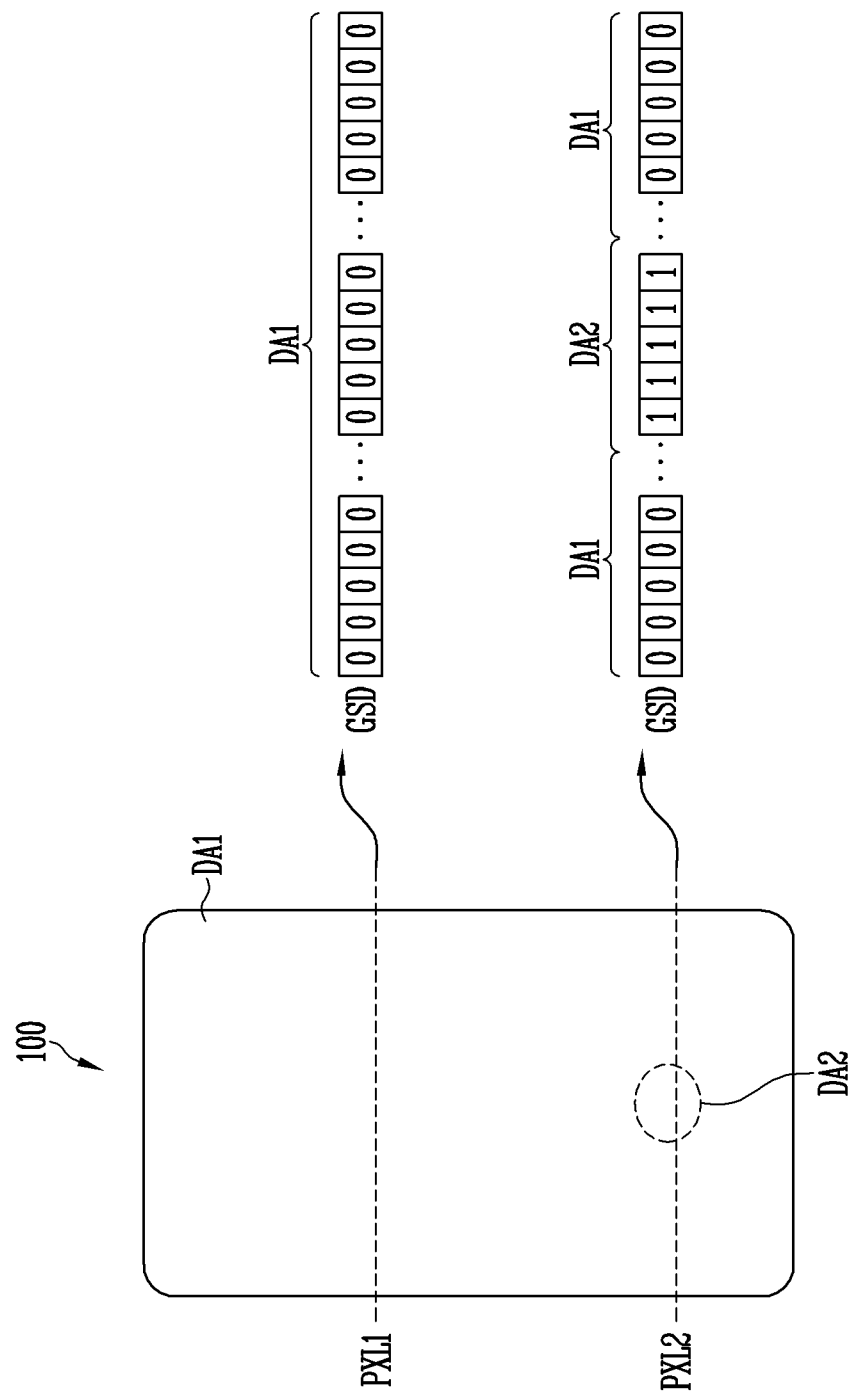

DRIVING CHIP, DISPLAY DEVICE, AND METHOD OF DRIVING DISPLAY DEVICE

CROSS-REFERENCE TO RELATED PATENT APPLICATION(S)

This application claims priority to and benefit of Korean Patent Application No. 10-2019-0115264 filed on Sep. 19, 2019 in the Korean Intellectual Property Office, the disclosure of the Korean Patent Application is herein incorporated in its entirety by reference.

BACKGROUND

1. Field

The technical field relates to a display device, and more particularly, to a driving chip, a display device including the driving chip, and a method of driving the display device.

2. Description of the Related Art

A display device includes a display panel having a pixel, a scan line connected to the pixel and transmitting a scan signal, and a data line transmitting a data voltage (data signal) to the pixel and. In addition, the display device includes a light sensor—such as an infrared sensor—for fingerprint recognition or other biometric recognition.

Currently, technology is being developed for obtaining biometric information by mounting a light sensor on a display area. The light sensor senses light emitted from the pixel and reflected from a user, and generates a signal required for an electronic apparatus including the display device based on the sensed result. Sensing sensitivity and accuracy of the light sensor may vary according to the intensity of light incident on the light sensor.

An intensity (or luminance) of the light output from the pixel may be determined by the data voltage (for example, a gamma voltage or a grayscale voltage). There is a need to improve the sensing sensitivity and accuracy of the light sensor overlapping the display area.

SUMMARY

An object of the disclosure is to provide a display device including a data driver that controls a luminance of a display area overlapping a light sensor differently from another display area.

Another object of the disclosure is to provide a driving chip including the data driver.

Still another object of the disclosure is to provide a method of driving the display device.

However, the object of the disclosure is not limited to the above-described objects, and may be variously expanded within a range without departing from the spirit and scope of the disclosure.

In order to achieve an object of the disclosure, a display device according to embodiments of the disclosure may include a display unit comprising a plurality of pixels disposed in a display area, the display area comprising a first area and a second area; a gamma voltage supply including gamma voltage generators that are configured to generate respective ones of gamma voltage sets; and a data driver configured to convert image data into data signals using the gamma voltage sets, supply the data signals to the pixels, generate the data signals corresponding to the first area and the second area using a first group comprising some of the gamma voltage generators in a first mode, and generate the data signals corresponding to the second area using a second group comprising different gamma voltage generators from the first group in a second mode.

According to an embodiment, the data driver may generate the data signals corresponding to the first area using the first group in the second mode. According to an embodiment, the display device may further include a light sensor overlapping the second area and disposed on an opposite side of a display surface of the display unit; a memory configured to store gamma selection data defining the second area and to output the gamma selection data to the data driver in correspondence with activation of the light sensor; and a controller configured to supply the image data to the data driver and control the memory in correspondence with the activation of the light sensor.

According to an embodiment, the gamma voltage supply may include a first gamma voltage generator configured to generate a first gamma voltage set of the gamma voltage sets corresponding to first color light, a second gamma voltage generator configured to generate a second gamma voltage set of the gamma voltage sets corresponding to second color light, a third gamma voltage generator configured to generate a third gamma voltage set of the gamma voltage sets corresponding to third color light, and a first high luminance gamma voltage generator configured to generate a first high luminance gamma voltage set corresponding to color light including at least one of the first to third color light.

According to an embodiment, the first group may include the first gamma voltage generator, the second gamma voltage generator, and the third gamma voltage generator.

According to an embodiment, the second group comprises two of the first gamma voltage generator, the second gamma voltage generator, the third gamma voltage generator, and the first high luminance gamma voltage generator.

According to an embodiment, the first color light, the second color light, and the third color light may be red light, blue light, and green light, respectively.

According to an embodiment, the first high luminance gamma voltage set may correspond to the green light and may be applied to the data driver in the second mode.

According to an embodiment, the second group comprises the second gamma voltage generator, the third gamma voltage generator, and the first high luminance gamma voltage generator.

According to an embodiment, the gamma voltage supply may further include a second high luminance gamma voltage generator configured to generate a second high luminance gamma voltage set corresponding to the blue light.

According to an embodiment, the second group may include the first gamma voltage generator, the first high luminance gamma voltage generator, and the second high luminance gamma voltage generator. According to an embodiment, the data driver may include a first latch configured to simultaneously latch the image data and simultaneously output the image data in a horizontal line unit; a second latch configured to receive the gamma selection data from the memory in the second mode, simultaneously latch the gamma selection data, and output the gamma selection data in the horizontal line unit; and a digital-analog converter configured to convert the latched image data into the data signals based on the gamma selection data, the first gamma voltage set, the second gamma voltage set, the third gamma voltage set, and the first high luminance gamma voltage set.

According to an embodiment, the digital-analog converter may be configured to select one of the first gamma voltage set and the first high luminance gamma voltage set based on the gamma selection data in the second mode, and output a data signal from the selected one.

According to an embodiment, in the second mode, the digital-analog converter may convert the latched image data corresponding to the second area into the data signals using the second group, and in the second mode, the digital-analog converter may convert the latched image data corresponding to the first area into the data signals using the first group.

According to an embodiment, in the first mode, the digital-analog converter may convert the latched image data corresponding to the first area and second area into the data signals using the first group.

According to an embodiment, the light sensor may be deactivated in the first mode, the light sensor may be activated in the second mode, and a luminance of the second area may be higher than a luminance of the first area in the second mode. In order to achieve an object of the disclosure, a method of driving a display device according to embodiments of the disclosure may include converting image data into data signals using a first gamma voltage set, a second gamma voltage set, and a third gamma voltage set in a first mode; displaying an image based on the data signals in a first mode; converting first image data corresponding to a first area of a display area into first data signals using the first gamma voltage set, the second gamma voltage set, and the third gamma voltage set in a second mode in which a light sensor disposed on an opposite side of a display surface is activated; converting second image data corresponding to a second area of the display area into second data signals using the first gamma voltage set, the second gamma voltage set, and a high luminance gamma voltage set in the second mode, and displaying the image based on the first data signals and the second data signals in the second mode.

According to an embodiment, the third gamma voltage set and the high luminance gamma voltage set may include gamma voltages for the same color light, and a luminance of the second area may be higher than a luminance of the first area in the second mode. In order to achieve an object of the disclosure, a driving chip according to embodiments of the disclosure may include a gamma voltage supply comprising gamma voltage generators that generate respective ones of gamma voltage sets; and a data driver configured to convert image data into data signals using the gamma voltage sets, wherein, in the first mode, the data driver generates the data signals corresponding to a first area and second area included in a display area using a first group comprising some of the gamma voltage generators, and in a second mode, the data driver generates the data signals corresponding to the second area using the second group comprising different gamma voltage generators from the first group, and generates the data signals corresponding to the first area using the first group According to an embodiment, the gamma voltage supply may include a first gamma voltage generator configured to generate a first gamma voltage set of the gamma voltage generators corresponding to first color light, a second gamma voltage generator of the gamma voltage generators configured to generate a second gamma voltage set corresponding to second color light, a third gamma voltage generator of the gamma voltage generators configured to generate a third gamma voltage set corresponding to third color light, and a first high luminance gamma voltage generator configured to generate a high luminance gamma voltage set corresponding to one of the first to third color light. The first group may include the first gamma voltage generator, the second gamma voltage generator, and the third gamma voltage generator. The second group may include the high luminance gamma voltage generator and gamma voltage generators that do not correspond to the color light of the high luminance gamma voltage set among the first gamma voltage generator, the second gamma voltage generator, and the third gamma voltage generator.

According to the display device and the method of driving the same, sensing sensitivity and accuracy of the light sensor may be improved by increasing a luminance of the second area corresponding to the light sensor in the second mode. In addition, a gamma (e.g., a gamma curve or gamma voltages) of the first area except for the second area is stably maintained in the second mode, and thus the first area may display a high quality image. Therefore, sensing performance of the light sensor may be improved and image quality may be improved together.

However, the effects of the disclosure are not limited to the above-described effects, and may be variously expanded within a range without departing from the spirit and scope of the disclosure.

BRIEF DESCRIPTION OF THE DRAWINGS

The above and other features of the present inventive concept will become more apparent by describing in further detail embodiments thereof with reference to the accompanying drawings, in which:

FIG. 6 is a diagram illustrating gamma selection data supplied to the data driver of FIG. 3;

FIG. 8 is a diagram illustrating operations of the data driver and the gamma voltage supply of FIG. 3 in a second mode;

DETAILED DESCRIPTION OF THE EMBODIMENT

Figure 1:
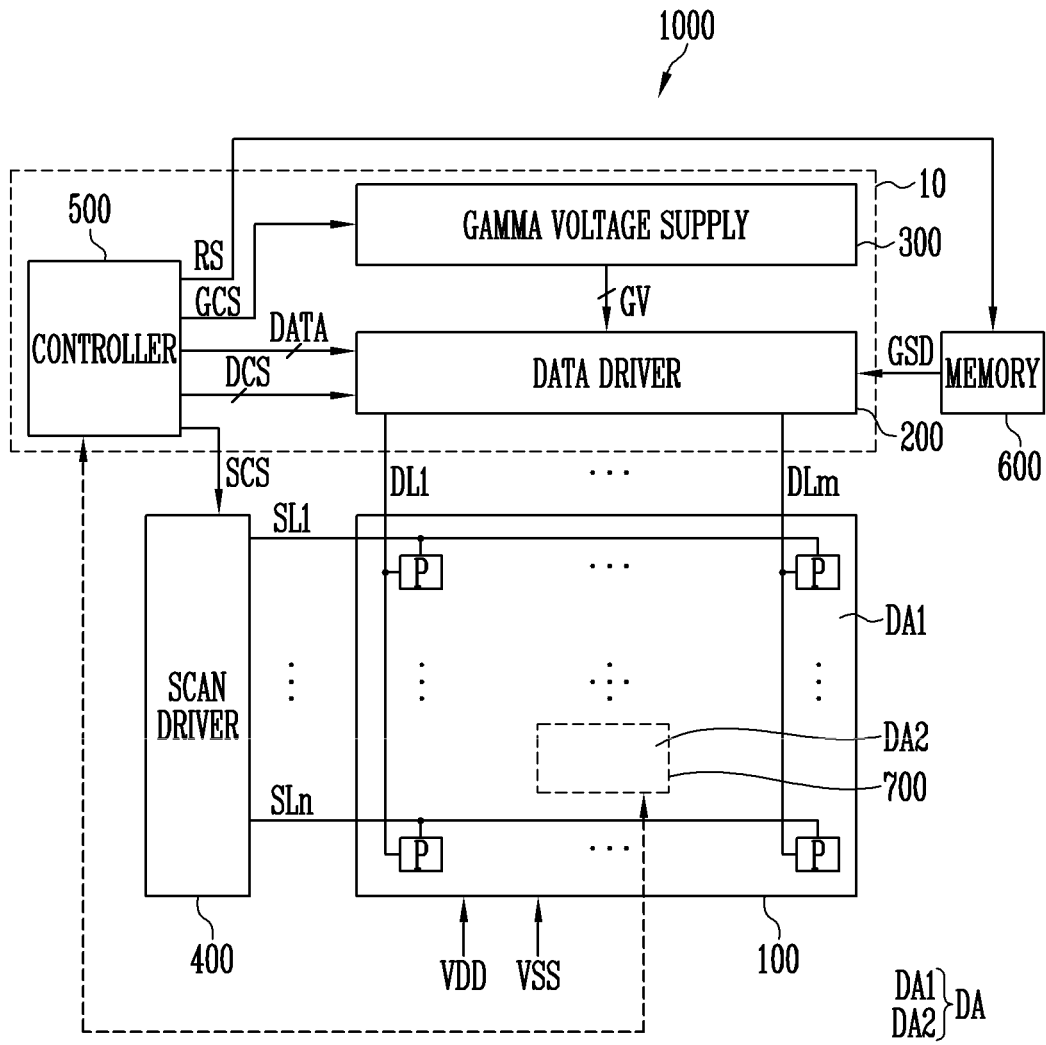
FIG. 1 is a block diagram illustrating a display device according to embodiments of the disclosure.

Example embodiments are described with reference to the accompanying drawings, wherein like reference numerals may refer to like elements.

Although the terms "first," "second," etc. may be used to describe various components, these components should not be limited by these terms. These terms are used to distinguish one component from another. A first component may be termed a second component without departing from teachings of one or more embodiments. The description of a component as a "first" component may not require or imply the presence of a second component or other components. The terms "first," "second," etc. may be used to differentiate different categories or sets of components. For conciseness, the terms "first," "second," etc. may represent "first-type (or first-set)," "second-type (or second-set)," etc., respectively.

The singular forms "a," "an," and "the" may include the plural forms as well, unless the context clearly indicates otherwise.

When a first element is referred to as being "on" a second element, the first element can be directly or indirectly on the second element. One or more intervening elements may be present between the first element and the second element.

Sizes of elements in the drawings may be exaggerated for convenience of explanation.

Figure 2A:
FIG. 2A is a cross-sectional view schematically illustrating a display area of the display device of FIG. 1.
Figure 2B:
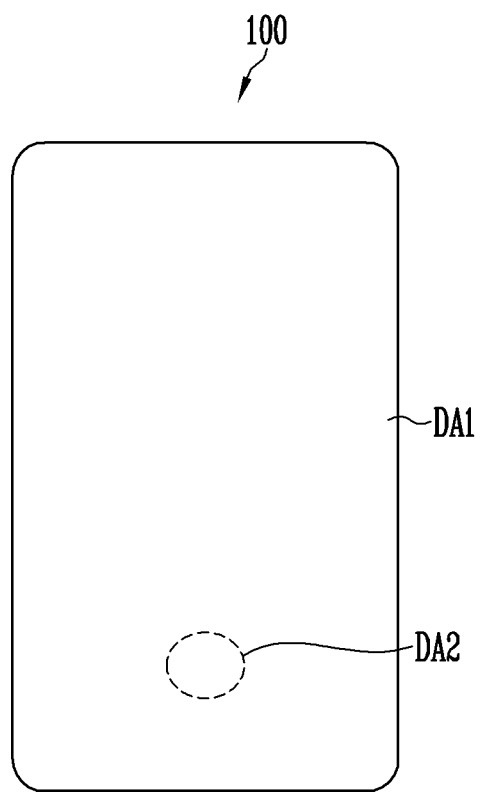
FIG. 2B is a plan view illustrating the display area of the display device of FIG. 1.

FIG. 1 is a block diagram illustrating a display device according to embodiments of the disclosure, FIG. 2A is a cross-sectional view schematically illustrating a display area of the display device of FIG. 1, and FIG. 2B is a plan view illustrating the display area of the display device of FIG. 1.

Referring to FIGS. 1 to 2B, the display device 1000 may include a display unit 100, a data driver 200, a gamma voltage supply 300, a scan driver 400, and a controller 500. In an embodiment, the display device 1000 may further include a memory 600 and a light sensor 700.

The display device 1000 may be a self-luminous display device including a plurality of self-luminous elements. For example, the display device 1000 may be an organic light emitting display device including an organic light emitting elements or a display device including inorganic light emitting elements. The display device 1000 may be a liquid crystal display device, a plasma display device, a quantum dot display device, or the like.

The display device 1000 may be a flat panel display device, a flexible display device, a curved display device, a foldable display device, or a bendable display device. In addition, the display device may be part of a transparent display device, a head-mounted display device, a wearable display device, or the like.

The display unit 100 may include a plurality of scan lines SL1 to SLn, a plurality of data lines DL1 to DLm, and a plurality of pixels P connected to respective scan lines SL1 to SLn and respective data lines DL1 to DLm (where n and m are integers greater than 1). The pixel P may include a plurality of sub pixels. For example, each of the sub pixels may emit light of one of red, blue, and green. The sub pixels may also emit light of one of cyan, magenta, yellow, and white. Hereinafter, for convenience of description, the pixel P refers to one sub pixel.

The display unit 100 may define the display area DA including a first area DA1 and a second area DA2, with the pixels P included in the display area DA. In addition, the display unit 100 may be formed on a display panel DP.

In an embodiment, the second area DA2 may partially or entirely overlap an area where the light sensor 700 is disposed. The first area DA1 includes the whole display area DA except for the second area DA2. For example, as shown in FIG. 2B, the second area DA2 may be formed in a circular or elliptical shape on a portion of the display area DA. The shape and area of the second area may vary correspond to the position of the light sensor 700 and the size and shape of the area where the light sensor 700 is disposed.

In an embodiment, the display unit 100 may be driven in a first mode or a second mode. The first mode may be defined as a mode in which a normal image is displayed, and the second mode may be defined as a mode in which the light sensor 700 is activated. For example, in the second mode, the light sensor 700 may performs a light sensing operation, and fingerprint recognition, iris recognition, or the like may be performed.

The light sensor 700 may be an optical sensor that senses biometric information such as a user's fingerprint. For example, the light sensor 700 may sense the biometric information using infrared light, visible light, and the like, and may be diversified into a biometric information sensor such as a fingerprint sensor, an iris recognition sensor, and an arterial sensor. The light sensor 700 may function as a proximity sensor such as a motion sensor and a gesture sensor. The light sensor 700 may be an ultrasonic sensor.

Sensing sensitivity and accuracy of the light sensor 700 may vary according to an intensity of light incident on the light sensor. For example, the greater the intensity of the light incident on the light sensor 700 (that is, the higher the luminance), the better the sensing sensitivity and accuracy of the light sensor 700. Therefore, in the second mode, as the luminance of the second area DA2 is higher, the sensing accuracy of the light sensor 700 may increase.

When a driving transistor of the pixel P is a PMOS (P-channel metal-oxide semiconductor) transistor, in order to increase the luminance of the second area DA2, a gamma voltage corresponding to a grayscale value of image data DATA is required to be lowered. The existing data driver uses the same gamma curve (or gamma set) for each pixel P of the same color with respect to the entire display area DA. Therefore, when the luminance is increased to improve performance of the light sensor 700, the gamma value (e.g., the gamma voltage of the corresponding grayscale) is undesirably changed since the luminance is also increased in the first area DA1. Therefore, in the second mode the color of the image is changed and image quality is degraded.

To improve image quality, the display unit 100 should be driven to only increase the luminance of the second area DA2 in the second mode while maintaining the gamma of the first area DA1 equal to the gamma of the first mode.

The display device 1000 according to an embodiment of the disclosure may include the gamma voltage supply 300 and the data driver 200 having a configuration for achieving the above-described goal. Therefore, when the light sensor 700 is activated, the second area DA2 may display an image at a luminance higher than that of the first area DA1.

The controller 500 may generate a first control signal SCS, a second control signal DCS, and a third control signal GCS in correspondence with synchronization signals supplied from the outside. The first control signal SCS may be supplied to the scan driver 400, the second control signal DCS may be supplied to the data driver 200, and the third control signal GCS may be supplied to the gamma voltage supply 300. In addition, the controller 500 may rearrange input image data supplied from the outside into image data DATA and supply the image data DATA to the data driver 200. In an embodiment, the controller 500 may include a function of a timing controller for controlling driving of the scan driver 400, the data driver 200, and the like.

The controller 500 may control the activation of the light sensor 700 in correspondence with the driving of the display unit 100, and control an operation of the memory 600, the gamma voltage supply 300, or the like in correspondence with the driving of the light sensor 700. In an embodiment, the controller 500 may supply a read signal RS to the memory 600 for controlling the operation of the memory 600 in correspondence with the activation of the light sensor 700. The read signal RS may be output only in the second mode.

The first control signal SCS may include a scan start pulse and clock signals. The scan start pulse may control a first timing of the scan signal. The clock signals may be used to shift the scan start pulse.

The second control signal DCS may include a source start pulse and clock signals. The source start pulse controls a sampling start time point of data. The clock signals are used to control a sampling operation.

The third control signal GSC may be used to determine gamma voltage sets applied to gamma voltage generators included in the gamma voltage supply 300.

The scan driver 400 may receive the first control signal SCS from the controller 500 and may supply the scan signal to the scan lines SL1 to SLn based on the first control signal SCS. For example, the scan driver 400 may sequentially supply the scan signals to the scan lines SL1 to SLn. When the scan signals are sequentially supplied, the pixels P may be selected in a horizontal line unit (or pixel row unit).

In an embodiment, the scan driver 400 may an integrated circuit, or IC, that is formed on the display panel DP and connected to the display panel DP in the form of a tape carrier package.

The gamma voltage supply 300 may generate gamma voltages GV (for example, grayscale voltages) corresponding to a grayscale. The gamma voltages GV may be supplied to the data driver 200. The gamma voltages GV are generated from gamma voltage sets, and the gamma voltage supply 300 may include a plurality of gamma voltage generators that generate respective ones of gamma voltage sets. For example, the gamma voltage sets may correspond to the pixels P emitting different color light. For example, when the pixel P includes a red pixel, a blue pixel, and a green pixel, the gamma voltage generators may include a first gamma voltage generator that generates a first gamma voltage set corresponding to the red pixel, a second gamma voltage generator that generates a second gamma voltage set corresponding to the blue pixel, and a third gamma voltage generator that generates a third gamma voltage set corresponding to the green pixel.

In an embodiment, the gamma voltage supply 300 may further include a high luminance gamma voltage generator activated in the second mode. For example, the high luminance gamma voltage generator may generate a high luminance gamma voltage set for some pixels included in the second area DA2 in the second mode. Therefore, a part of the image data DATA corresponding to the second area DA2 may be converted into data signals of an analog type based on the high luminance gamma voltage set.

For example, the high luminance gamma voltage generator may replace the third gamma voltage generator for the second area DA2. That is, a data signal (grayscale voltage) based on the high luminance gamma voltage set may be supplied to green pixels included in the second area DA2. The data signal based on the third gamma voltage set may be supplied to the first area DA1 other than the second area DA2. That is, in the second mode and with respect to the green pixels, different gamma voltage sets (that is, the third gamma voltage set or the high luminance gamma voltage set) may be used in the second area DA2 and the first area DA1.

The data driver 200 may receive the second control signal DCS and the image data DATA from the controller 500. The data driver 200 may supply the data signal to the data lines DL1 to DLm in correspondence with the second control signal DCS. The data signal supplied to the data lines DL1 to DLm may be supplied to the pixels P selected by the scan signal. To this end, the data driver 200 may supply the data signal to the data lines DL1 to DLm in synchronization with the scan signal.

In an embodiment, the data driver 200 may convert the image data DATA into the data signals using the gamma voltage sets generated by the gamma voltage supply 300, and may supply the data signals to the pixels P through the data lines DL1 to DLm. For example, the data driver 200 may select and output a data signal (data voltage) corresponding to a grayscale value of the image data DATA.

The data driver 200 may generate the data signals corresponding to the first area DA1 and the second area DA2 using a first group including some of the gamma voltage generators in the first mode. For example, the first group may be the first to third gamma voltage generators.

The data driver 200 may generate the data signals corresponding to the second area DA2 by using a second group different from the first group in the second mode. The data signals corresponding to the first area DA1 may be generated based on the gamma voltage sets of the first group. The second group may be the first gamma voltage generator, the second gamma voltage generator, and the high luminance gamma voltage generator. The luminance of the first area DA1 and the second area DA2 may be different from each other in the second mode.

Meanwhile, at least one of the data driver 200, the gamma voltage supply 300, and the controller 500 may be formed on the display unit 100 (or the display panel DP of FIG. 2A), or may be connected to the display unit 100 in a form of a driving chip 10 (for example, an IC). In addition, at least two of the data driver 200, the gamma voltage supply 300, and the controller 500 may be integrated into one driving chip. For example, as shown in FIG. 1, the data driver 200, the gamma voltage supply 300, and the controller 500 may be included in one driving chip 10.

In an embodiment, the display device 1000 may further include a light emitting driver that supplies a light emission control signal to the pixel P, and a power supply that supplies predetermined power voltages to the pixel P.

The memory 600 may store gamma selection data GSD defining the second area DA2. In an embodiment, the gamma selection data GSD may include 1-bit data values corresponding to each pixel P. For example, the gamma selection data GSD may include a first value corresponding to the first area DA1 or a second value corresponding to the second area DA2. In an embodiment, the memory 600 may be a non-volatile memory such as flash memory or read-only memory (ROM).

The memory 600 may provide the gamma selection data GSD to the data driver 200 in response to the read signal RS supplied from the controller 500. The data driver 200 may determine whether to use the third gamma voltage set or the high luminance gamma voltage set for each pixel P based on the gamma selection data GSD.

In an embodiment, the memory 600 may include a plurality of sets of the gamma selection data GSD respectively corresponding to the various second areas DA2. In this case, a gamma selection data set corresponding to (e.g., matching) a position or a shape of the second area DA2 may be adaptively selected and supplied to the data driver 200.

Meanwhile, as shown in FIG. 2A, a touch sensor TS may be disposed on the display panel DP. The touch sensor TS may be driven in a capacitive method or a resistive film method. The touch sensor TS may sense not only a touch position but also an intensity of the touch.

In an embodiment, the touch sensor TS may be a touch panel attached on the display panel DP by a transparent adhesive member, or may be directly disposed on the display panel DP. In an embodiment, the touch sensor TS may be built in the display panel DP.

A window cover WC of a transparent material may be disposed on the touch sensor TS. The window cover WC may be disposed on the outermost side of a front surface (that is, a display surface) of the display device 1000, and may protect components inside the display device 1000 from external impact, scratches, and the like. The window cover WC may be a glass material or formed of a polymer film. For example, the window cover WC may include at least one of polyimide, polyethylene terephthalate (PET), or another polymer material.

In an embodiment, a main board MB that controls an electronic apparatus including the display device 1000 may be disposed under the light sensor 700. Each of the light sensor 700 and the display panel DP may be electrically connected to the main board MB.

The display device 1000 according to the embodiments of the disclosure may increase the luminance of only the second area DA2 in the second mode and may maintain the gamma of the first area DA1 equal to the gamma of the first mode.

Figure 3:
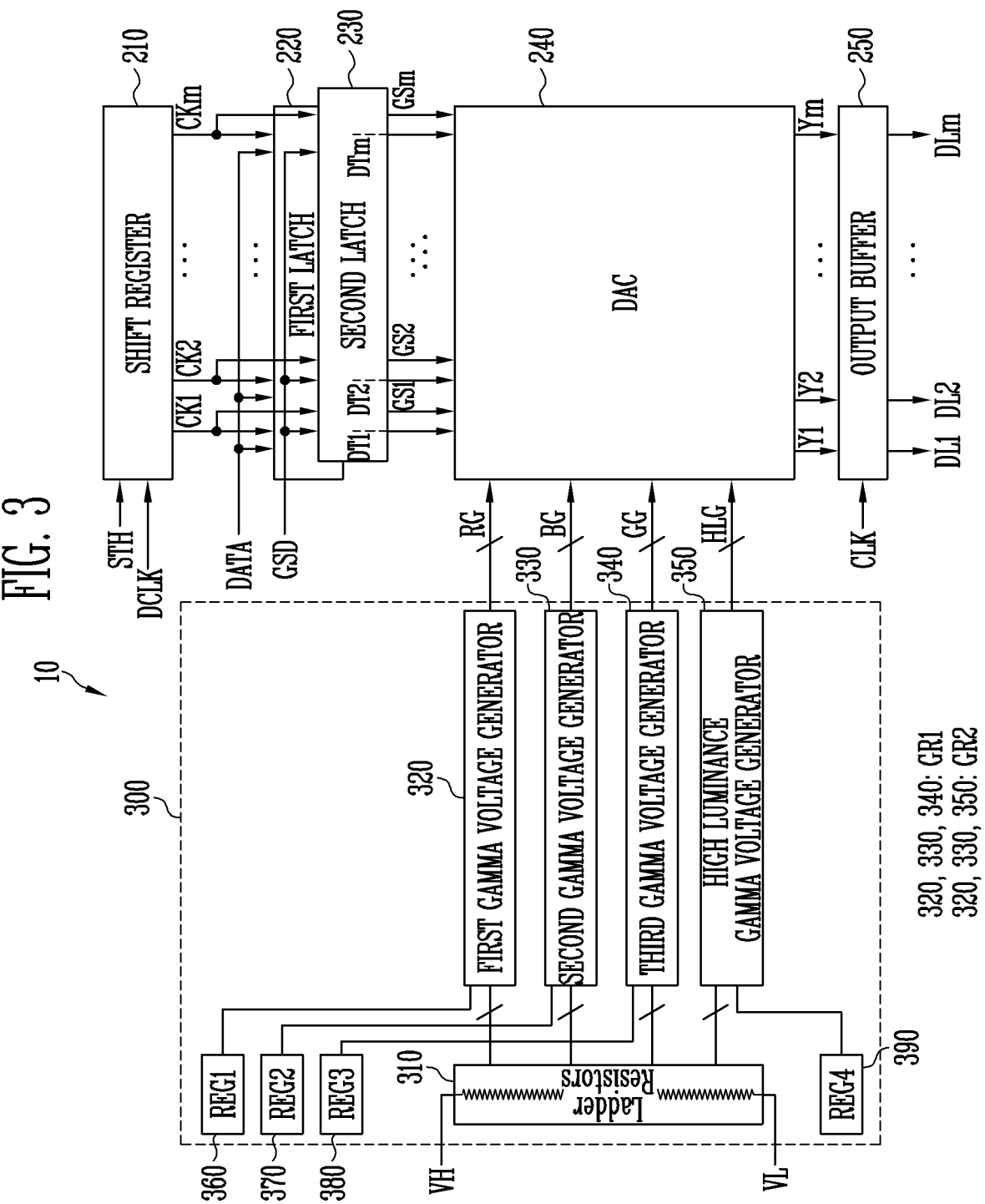
FIG. 3 is a diagram illustrating a data driver and a gamma voltage supply included in the display device of FIG. 1.
Figure 4:
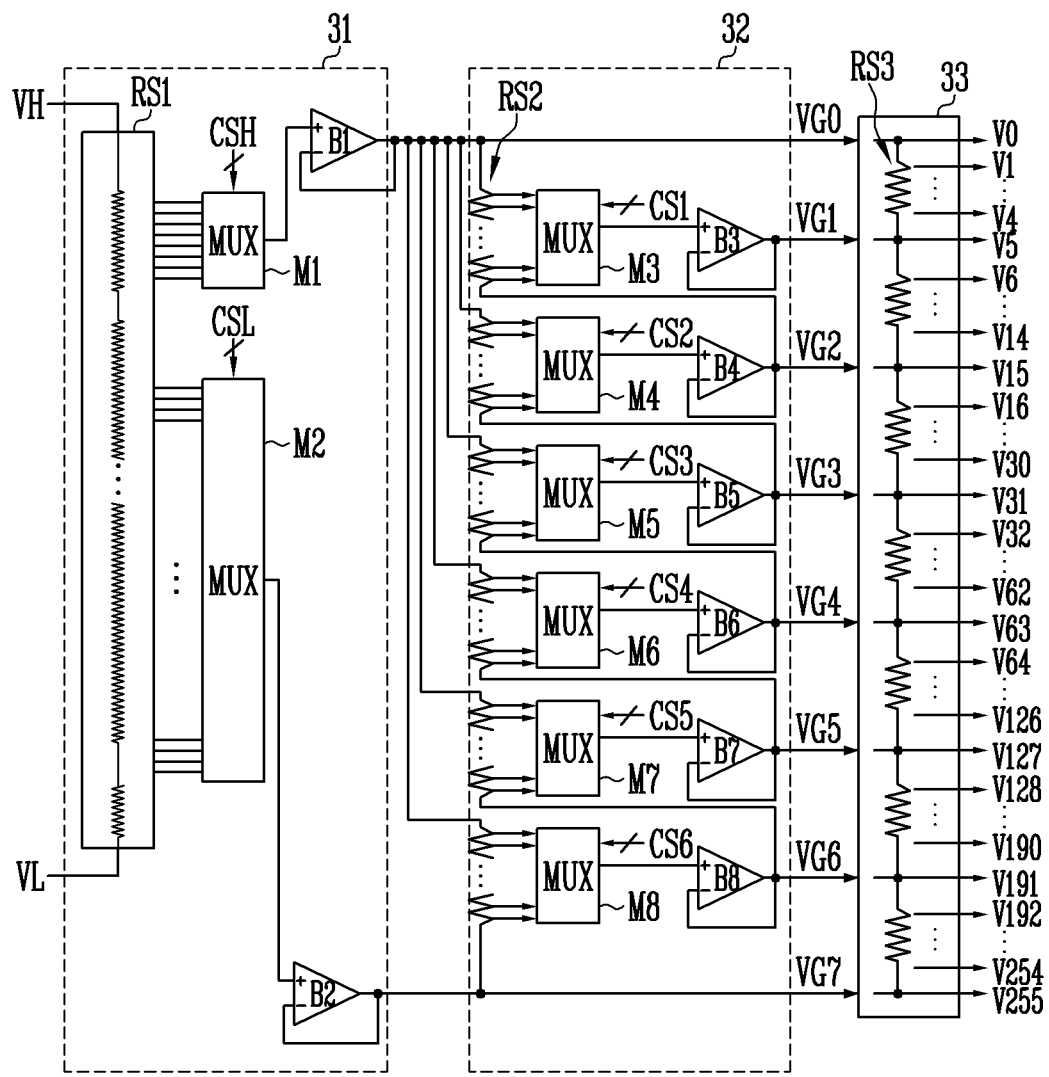
FIG. 4 is a diagram illustrating a gamma voltage generator included in the gamma voltage supply of FIG. 3.

FIG. 3 is a diagram illustrating the data driver and the gamma voltage supply included in the display device of FIG. 1, and FIG. 4 is a diagram illustrating the gamma voltage generator included in the gamma voltage supply of FIG. 3.

Referring to FIGS. 1, 3, and 4, the data driver 200 and the gamma voltage supply 300 may be included in the driving chip 10.

In the first mode, the data driver 200 may generate the data signals for the first and second areas DA1 and DA2 using the gamma voltage generators of a first group GR1. In the second mode, the data driver 200 may generate the data signals of the second area DA2 using the gamma voltage generators of a second group GR2, and may generate the data signals of the first area DA1 using the gamma voltage generators of the first group GR1.

In an embodiment, the data driver 200 may include a shift register 210, a first latch 220, a second latch 230, a digital-analog converter 240, and an output buffer 250.

The shift register 210 may control a timing at which the image data DATA is sequentially stored in the first latch 220. For example, the shift register 210 may include m shift circuits corresponding to the number of the data lines DL1 to DLm of FIG. 1.

The shift register 210 may receive a horizontal start signal STH and a data clock signal DCLK from the controller 500. The shift register 210 may generate shifted clock signals, for example, latch clock signals CK1 to CKm by shifting the horizontal start signal STH in synchronization with the data clock signal DCLK. The shift register 210 may provide the latch clock signals CK1 to CKm to the first latch 220.

The first latch 220 may latch the image data DATA and simultaneously output the data in the horizontal line unit. The first latch 220 may have m latch circuits. In an embodiment, the first latch 220 may sequentially store the image data DATA corresponding to one horizontal line from one end of the latch circuit to the other end based on the latch clock signals CK1 to CKm. When storing of the image data DATA is completed, the first latch 220 may output latched image data DT1 to DTm in the horizontal line unit in response to a load signal. The image data DT1 to DTm corresponding to one horizontal line may be data of N bits (for example, N may be 8).

In an embodiment, the first latch 220 may include a sampling latch and a holding latch. For example, the first latch 220 may include m sampling latches for storing m pieces of digital image data DATA, respectively. Each sampling latch has a storage capacity corresponding to the number of bits of the image data DATA, and may sequentially store the image data DATA in response to sampling signals.

The m holding latches may simultaneously receive the latched image data DT1 to DTm from the sampling latches and store the latched image data DT1 to DTm, and may simultaneously supply the latched image data DT1 to DTm stored in a previous period to the digital-analog converter 240 (DAC).

The second latch 230 may receive the gamma selection data GSD from the memory 600 in the second mode. The second latch 230 may latch the gamma selection data GSD and output the gamma selection data GSD in the horizontal line unit. The second latch 230 may also include m sampling latches and m holding latches. That is, the second latch 230 is the same as a line memory of 1 bit.

In an embodiment, the gamma selection data GSD may include 1-bit data values corresponding to each pixel P, and each of the sampling latches included in the second latch 230 may have a storage capacity corresponding to 1 bit. In addition, an operation of the second latch 230 may be performed at substantially the same timing as the first latch 230. Therefore, the second latch 230 may simultaneously supply latched gamma selection data GS1 to GSm to the digital-analog converter 240 in the horizontal line unit.

In an embodiment, in the first mode, disable data may be supplied from the controller 500 to the second latch 230. In this case, the second latch 230 may not be operated, and an electrical connection between a high luminance gamma voltage generator 350 and the digital-analog converter 240 may be disconnected.

The digital-analog converter 240 may convert the latched image data DT1 to DTm into data signals Y1 to Ym of an analog type, based on the gamma voltages GV and the latched gamma selection data GS1 to GSm. The data signals converted to the analog type may be supplied to the output buffer 250.

The output buffer 250 may output the data signals Y1 to Ym output from the digital-analog converter 240 to the data lines DL1 to DLm. For example, the output buffer 250 may output the data signals Y1 to Ym corresponding to a corresponding pixel row to the data lines DL1 to DLm in response to a predetermined clock signal CLK.

The gamma voltage supply 300 may include gamma voltage generators 320, 330, 340, and 350 that generate gamma voltage sets RG, BG, GG, and HLG, respectively. In addition, the gamma voltage supply 300 may further include first to fourth resistors 360 to 390 and a resistor string 310 that divides a first voltage VH and a second voltage VL.

The gamma voltage supply 300 may generate the gamma voltages GV using the gamma voltage generators 320, 330, 340, and 350. For example, the gamma voltages GV may be determined based on a preset gamma curve (for example, 2.2 gamma curve or the like).

The first gamma voltage generator 320 may generate a first gamma voltage set RG corresponding to the first color light based on the data received from a first register 360. The first register 360 may include gamma voltage sets corresponding to a plurality of gamma curves of the first color light. A gamma curve for the first color light corresponding to the predetermined image data DATA may be selected, and the first register 360 may provide data including information of the corresponding gamma curve to the first gamma voltage generator 320. The first gamma voltage generator 320 may generate the first gamma voltage set RG including a plurality of gamma voltages based on the data including the information of the corresponding gamma curve. For example, the first color light may be red light, and the first gamma voltage set RG may include 8 bits (256) red gamma voltages. Since a configuration and an operation of the second gamma voltage generator 330, the third gamma voltage generator 340, and the high luminance gamma voltage generator 350 are similar to those of the first gamma voltage generator 320, repetitive description will be omitted.

The second gamma voltage generator 330 may generate a second gamma voltage set BG corresponding to one of the plurality of gamma curves stored in a second register 370. The second gamma voltage set BG may correspond to the second color light. For example, the second color light may be blue light, and the second gamma voltage set BG may include 8 bit (256) blue gamma voltages.

The third gamma voltage generator 340 may generate a third gamma voltage set GG corresponding to one of the plurality of gamma curves stored in a third register 380. The third gamma voltage set GG may correspond to the third color light. For example, the third color light may be green light, and the third gamma voltage set GG may include 8 bits (256) green gamma voltages.

According to an embodiment, the gamma voltage supply 300 may further include a gamma voltage generator and/or a gamma voltage set for generating gamma voltages GV for white light.

The high luminance gamma voltage generator 350 may generate a high luminance gamma voltage set HLG corresponding to one of the plurality of gamma curves stored in a fourth register 390. The high luminance gamma voltage set HLG may correspond to one of the first to third color light.

In an embodiment, the high luminance gamma voltage set HLG may correspond to the third color light that is the green light. In the second mode, the high luminance gamma voltage generator 350 may provide the high luminance gamma voltage set HLG to the digital-analog converter 240 instead of the third gamma voltage generator 340 with respect to the second area DA2.

Increasing a luminance of the red grayscale may cause a malfunction of the light sensor 700 sensing infrared light. In addition, increasing a luminance of a blue grayscale for the blue pixel having the fastest deterioration rate may adversely affect deterioration and lifetime of the display device 1000. Therefore, a luminance of the green pixel in the second mode may be increased to increase a luminance of the second area DA2. In an embodiment, the high luminance voltage set HLG may include gamma voltages (or gamma voltage information) for white light. In addition, according to the applied display device, the high luminance voltage set HLG may include gamma voltages for the blue light or gamma voltages for the red light.

In an embodiment, the first group GR1 may include the first to third gamma voltage generators 320, 330, and 340, and the second group GR2 may include the first gamma voltage generator 320, the second gamma voltage generator 330, and the high luminance gamma voltage generator 350.

In the first mode, the data signals may be generated by the first to third gamma voltage sets RG, BG, and GG generated by the first to third gamma voltage generators 320, 330, and 340 for the entire display area DA.

In the second mode, the data signals correspond to the first area DA1 may be generated by the first to third gamma voltage sets RG, BG, and GG generated by the first to third gamma voltage generators 320, 330, and 340. The data signals corresponding to the gamma voltage sets RG, BG, and HLG are generated by the first gamma voltage generator 320, the second gamma voltage generator 330, and the high luminance gamma voltage generator 350 with respect to the second area DA2.

In an embodiment, each of the gamma voltage generators 310 to 350 may be the circuit of FIG. 4. For example, FIG. 4 shows the gamma voltage generator 30.

The gamma voltage generator 30 may include a maximum-minimum selection circuit 31, an intermediate gamma selection circuit 32, and a gamma output circuit 33. FIG. 4 illustrates that the gamma voltage generator 30 generates 256 gamma voltages V0 to V255.

The maximum-minimum selection circuit 31 may include a first resistor string RS1, a first selector M1, a second selector M2, a first buffer B1, and a second buffer B2. The first resistor string RS1 may divide the first voltage VH and the second voltage VL to generate a plurality of voltages. At this point, a level of the first voltage VH may be higher than that of the second voltage VL, and the second voltage VL may be, for example, a ground voltage. The plurality of voltages between the first voltage VH and the second voltage VL may be output through the first resistor string RS1, and the first selector M1 may select one of the plurality of voltages based on a maximum selection signal CSH as a maximum intermediate gamma voltage VG0. The selected maximum intermediate gamma voltage VG0 may be output through a first buffer B1.

A voltage level of at least one of the first voltage VH and the second voltage VL may be changed according to the selected gamma curve.

The second selector M2 may select one of the plurality of voltages as a minimum intermediate gamma voltage VG7 based on a minimum selection signal CSL. The selected minimum intermediate gamma voltage VG7 may be output through a second buffer B2.

The intermediate gamma selection circuit 32 may generate a plurality of intermediate gamma voltages VG1 to VG6 based on the maximum intermediate gamma voltage VG0 and the minimum intermediate gamma voltage VG7.

The intermediate gamma selection circuit 32 may include a plurality of second resistor strings RS2 and a plurality of selectors M3 to M8. The intermediate gamma selection circuit 32 may select each one voltage according to first to sixth selection signals CS1 to CS6 among voltages generated by voltage division in each of the second resistance strings RS2, and may output the selected voltage as the plurality of intermediate gamma voltages VG1 to VG6. The intermediate gamma selection circuit 32 may further include buffers B3 to B8. The intermediate gamma voltages VG1 to VG6 may be output through the buffers B3 to B8.

The gamma output circuit 33 may include a third resistor string RS3. The gamma output circuit 33 may generate the plurality of gamma voltages V0 to V255 by voltage division between the intermediate gamma voltages VG0 to VG7 using the third resistor string RS3.

According to the circuit configuration of FIG. 4, each of the gamma voltage generators 320 to 350 may generate the gamma voltage sets RG, BG, GG, and HLG.

Figure 5A:
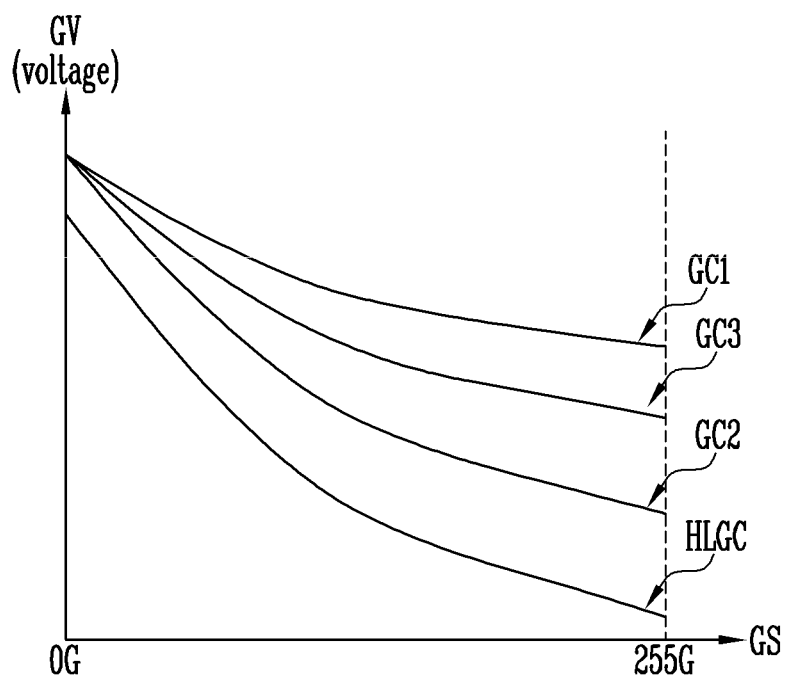
FIG. 5A is a diagram illustrating gamma voltage sets generated by the gamma voltage supply of FIG. 3.
Figure 5B:
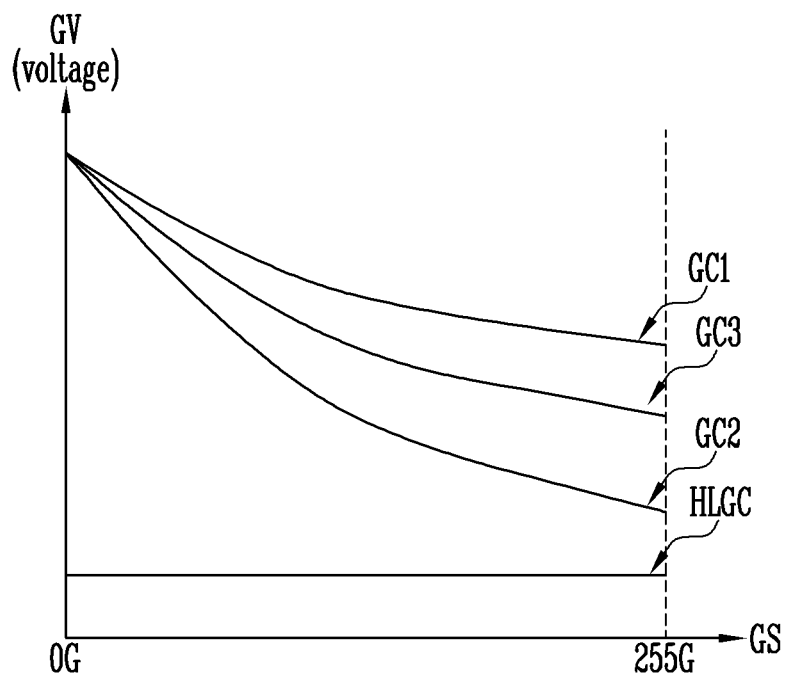
FIG. 5B is a diagram illustrating gamma voltage sets generated by the gamma voltage supply of FIG. 3.

FIGS. 5A and 5B are diagrams illustrating gamma voltage sets generated by the gamma voltage supply of FIG. 3.

Referring to FIGS. 1, 3, 5A, and 5B, the gamma voltage sets RG, BG, GG, and HLG may correspond to predetermined gamma curves GC1, GC2, GC3, and HLGC, respectively.

FIGS. 5A and 5B show a gamma voltage GV according to a grayscale GS when the driving transistor included in the pixel P is a PMOS transistor. In an embodiment, when the image data DATA is represented by 0 grayscale value 0G to 255 grayscale value 255G, the gamma voltage GV may decrease as the grayscale value increases. In an embodiment, when the driving transistor is an NMOS transistor, the gamma voltage GV may increase as the grayscale value GS increases.

The first gamma voltage set RG corresponding to the red pixel may correspond to a first gamma curve GC1. The second gamma voltage set BG corresponding to the blue pixel may correspond to a second gamma curve GC2. The third gamma voltage set GG corresponding to the green pixel may correspond to a third gamma curve GC3.

The high luminance gamma voltage set HLG corresponding to the green pixel may correspond to a fourth gamma curve HLGC. Therefore, with respect to the same grayscale value, a luminance of the green pixel to which the high luminance gamma voltage set HLG is applied may be higher than a luminance of the green pixel to which the third gamma voltage set GG is applied.

In an embodiment, as shown in FIG. 5B, the fourth gamma curve HLGC may have a constant gamma voltage GV regardless of the grayscale value GS. For example, the pixel P receiving the data signal converted based on the fourth gamma curve HLGC may emit light at a maximum luminance regardless of the grayscale value GS. Since the second area DA2 is covered by a finger or the like for fingerprint recognition, image quality of the second area DA2 in the second mode is not a big problem. In addition, light sensing sensitivity and accuracy may be further improved by the fourth gamma curve HLGC of FIG. 5B.

FIG. 6 is a diagram illustrating the gamma selection data supplied to the data driver of FIG. 3.

Referring to FIGS. 1, 3, and 6, the gamma selection data GSD may have a 1-bit value corresponding to all pixels P of the display area DA. For example, a first value (for example, a digital value 0) of the gamma selection data GSD may correspond to the pixel of the first area DA1, and a second value (for example, a digital value 1) may correspond to the pixel of the second area DA2.

All pieces of the gamma selection data GSD corresponding to each of the pixels P included in the first pixel row PXL1 may have the first value. Some of the pixels P of a second pixel row PXL2 may correspond to the second area DA2. Some of the gamma selection data GSD of the second pixel row PXL2 corresponding to the second area DA2 may have the second value.

In an embodiment, the gamma selection data GSD may be stored in the memory 600 and supplied to the second latch 230 of the data driver 200 in response to the read signal RS in the second mode. The second mode may be a driving mode in which the light sensor 700 is activated for fingerprint recognition or the like.

In the first mode, data may not be supplied to the second latch 230, or only data having the first value may be supplied to the second latch 230.

Figure 7:
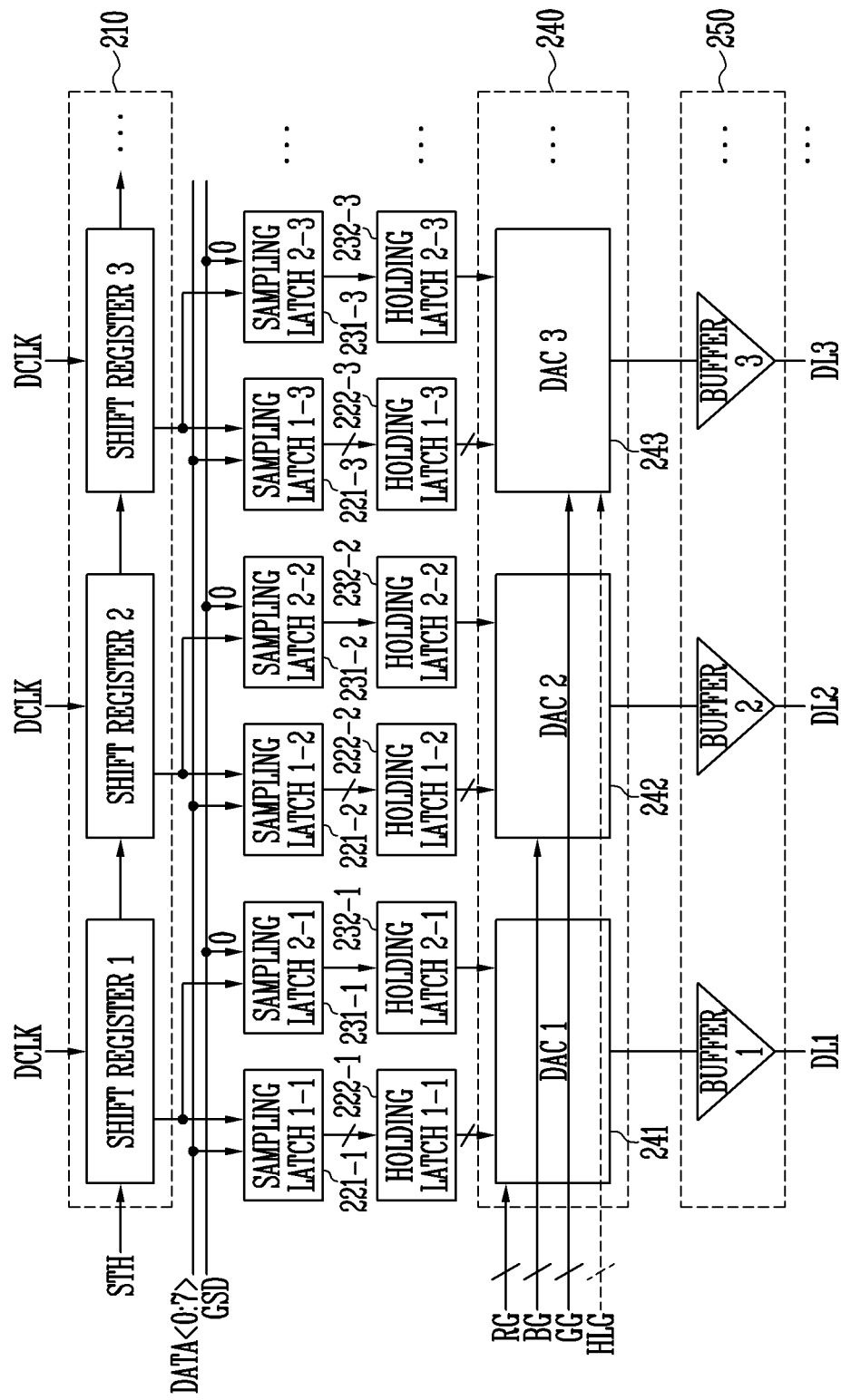
FIGS. 7 and 8 is a diagram illustrating operations of the data driver and the gamma voltage supply of FIG. 3 in a second mode.
Figure 8:
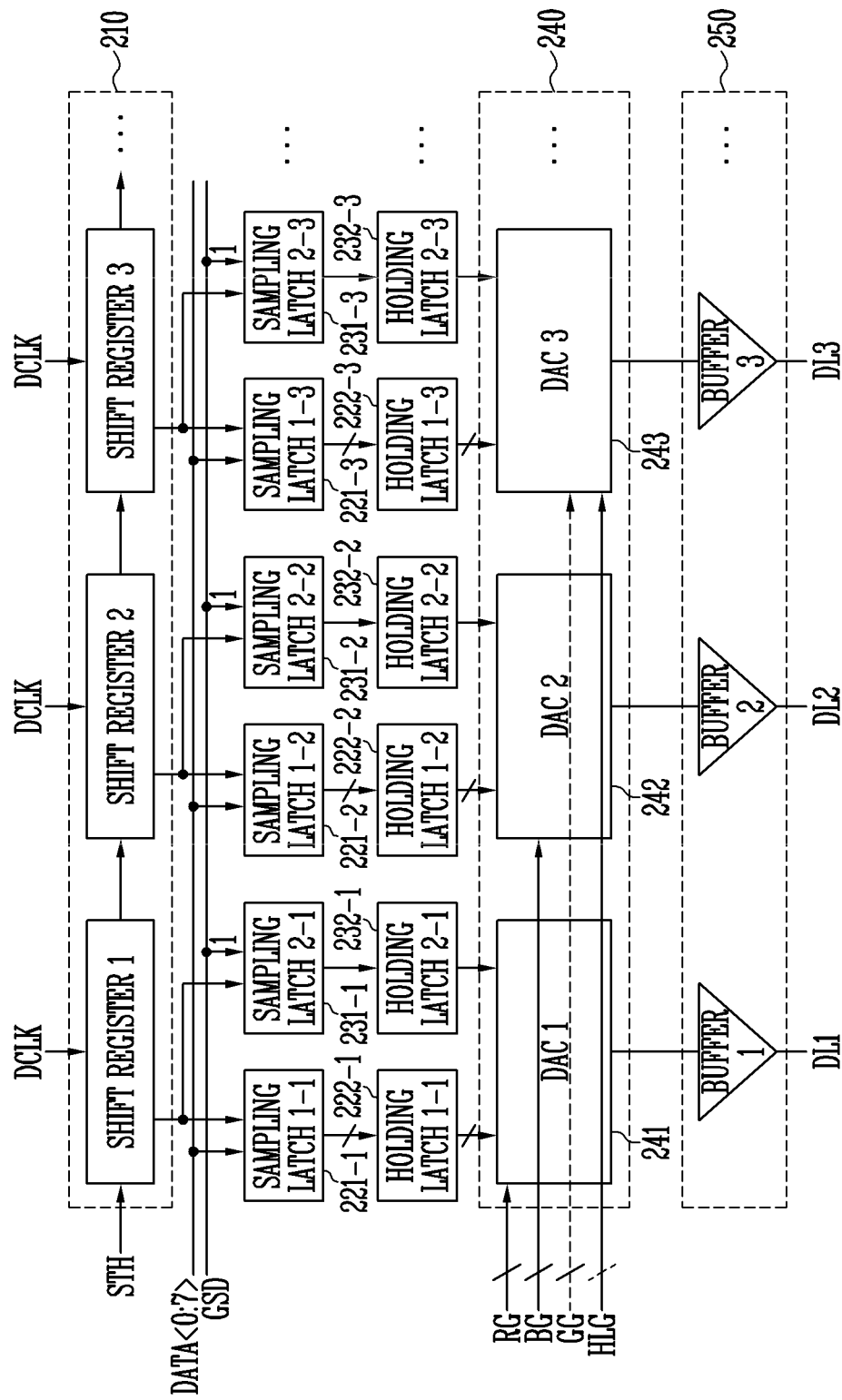

FIGS. 7 and 8 are diagrams illustrating examples of operations of the data driver and the gamma voltage supply of FIG. 3 in the second mode.

Referring to FIGS. 3, 7, and 8, the gamma selection data GSD supplied to data lines (for example, DL1 to DL3) passing through the second area DA2 along the pixel row (or horizontal line) may change.

In an embodiment, the first data line DL1 may be connected to a first pixel (for example, a red pixel), the second data line DL2 may be connected to a second pixel (for example, a blue pixel), and the third data line DL3 may be connected to a third pixel (for example, a green pixel).

As described with reference to FIG. 3, the first latch 220 may include sampling latches 221-1 to 221-3 and holding latches 222-1 to 222-3 corresponding to the data lines DL1 to DL3, respectively. Each of the sampling latches 221-1 to 221-3 may sequentially store image data of 8 bits. The holding latches 222-1 to 222-3 may store the image data latched from the sampling latches in a horizontal period unit and then output the image data to the digital-analog converter 240.

The second latch 230 may include sampling latches 231-1 to 231-3 and holding latches 232-1 to 232-3 each corresponding to respective ones of the data lines DL1 to DL3. Each of the sampling latches 231-1 to 231-3 may sequentially store the gamma selection data GSD of 1 bit. The holding latches 232-1 to 232-3 may store the gamma selection data GSD latched from the sampling latches in a horizontal period unit and then output the gamma selection data GSD to the digital-analog converter 240.

The digital-analog converter 240 may include converters 241 to 243 corresponding to respective ones of the data lines DL1 to DL3. In an embodiment, the first converter 241 may be connected to the first gamma voltage generator 320 that outputs the first gamma voltage set RG, and the second converter 242 may be connected to the second gamma voltage generator 330 that outputs the second gamma voltage set BG.

The third converter 243 may be connected to the third gamma voltage generator 330 that outputs the third gamma voltage set GG and the high luminance gamma voltage set generator 350 that outputs the high luminance gamma voltage set HLG.

The first and second converters 241 and 242 may output voltages selected from the first and second gamma voltage sets RG and BG as the data signal (data voltage), respectively, regardless of a value of the gamma selection data GSD. In contrast, the third converter 243 may output the data signal using one of the third gamma voltage set GG or the high luminance gamma voltage set HLG according to the value of the gamma selection data GSD.

As shown in FIG. 7, when the gamma selection data GSD of the first value is supplied from the second latch 230 to the digital-analog converter 240 (for example, when the gamma selection data GSD corresponding to the pixel row PXL1 of FIG. 6 is supplied to the digital-analog converter 240), the third converter 243 may output the data signal using the third gamma voltage set GG.

As shown in FIG. 8, when the gamma selection data GSD of the second value is supplied from the second latch 230 to the digital-analog converter 240 (for example, when the gamma selection data GSD corresponding to the second area DA2 of the second pixel row PXL2 of FIG. 6 is supplied to the digital-analog converter 240), the third converter 243 may output the data signal using the high luminance gamma voltage set HLG. However, even in this case, the converters corresponding to the first area DA1 of the second pixel row PXL2 may output the data signal using the third gamma voltage set GG as shown in FIG. 7.

That is, the high luminance gamma voltage set HLG may be applied only to the data signals of the green pixels of the second area DA2.

As described above, the display device 1000 according to embodiments increases the luminance of only the second area DA2 corresponding to the light sensor 700 in the second mode, and thus the sensing sensitivity and the accuracy of the light sensor 700 are improved. The gamma of the first area DA1 is stably maintained, and thus the first area DA1 may display an image of high quality. Therefore, the image quality and the sensing performance of the light sensor 700 may be simultaneously improved.

Figure 9A:
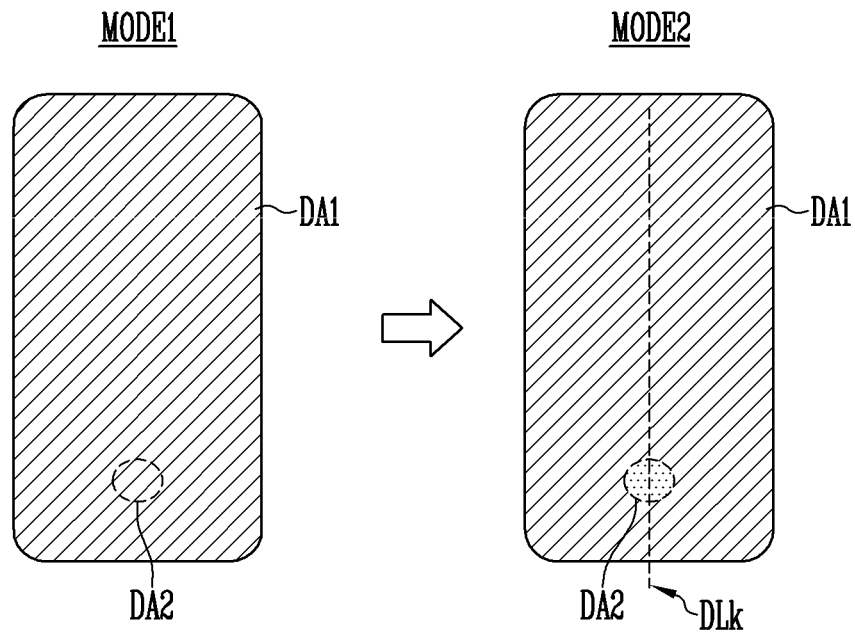
FIG. 9A is a diagram illustrating a luminance difference of the display area according to a driving mode of the display device of FIG. 1.
Figure 9B:
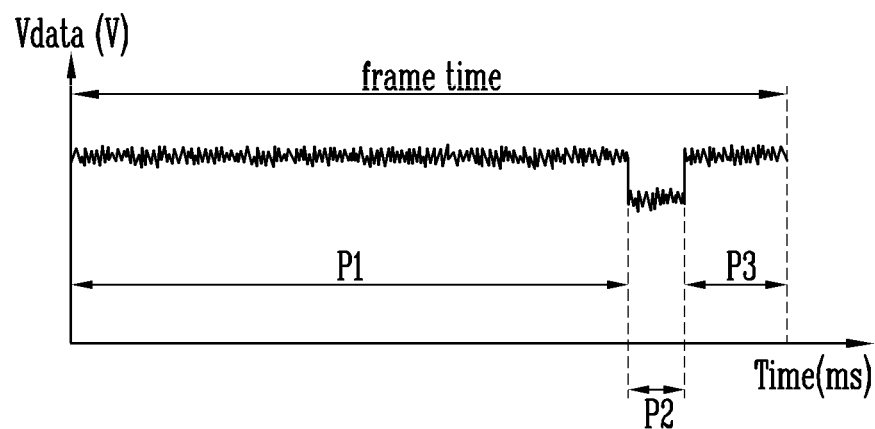
FIG. 9B is a diagram illustrating a change of a data voltage supplied to the display area of the display device of FIG. 1.

FIG. 9A is a diagram illustrating a luminance difference of the display area according to a driving mode of the display device of FIG. 1, and FIG. 9B is a diagram illustrating a change of the data voltage supplied to the display area of the display device of FIG. 1.

Referring to FIGS. 1, 9A, and 9B, the display device 1000 may be driven in the first mode or the second mode.

In the first mode, since the same gamma voltage sets are applied to both of the first area DA1 and the second area DA2, the luminance of the first area DA1 and the luminance of the second area DA2 are substantially the same.

In the second mode, since the high luminance gamma voltage set is applied only to some of the pixels P of the second area DA2, the luminance of the second area DA2 is higher than the luminance of the first area DA1.

In an embodiment, as shown in FIG. 9B, when the same image data is applied to the entire display area DA in the second mode, a data voltage Vdata supplied to one data line DLk may vary. For example, the data voltage Vdata supplied to the first area DA1 may be in a first period P1 and a third period P3, and the data voltage Vdata supplied to the second area DA2 may be in a second period P2. That is, the data voltage Vdata corresponding to the second area DA2 of which the luminance is relatively high may be smaller than the data voltage Vdata corresponding to the first area DA1.

Figure 10:
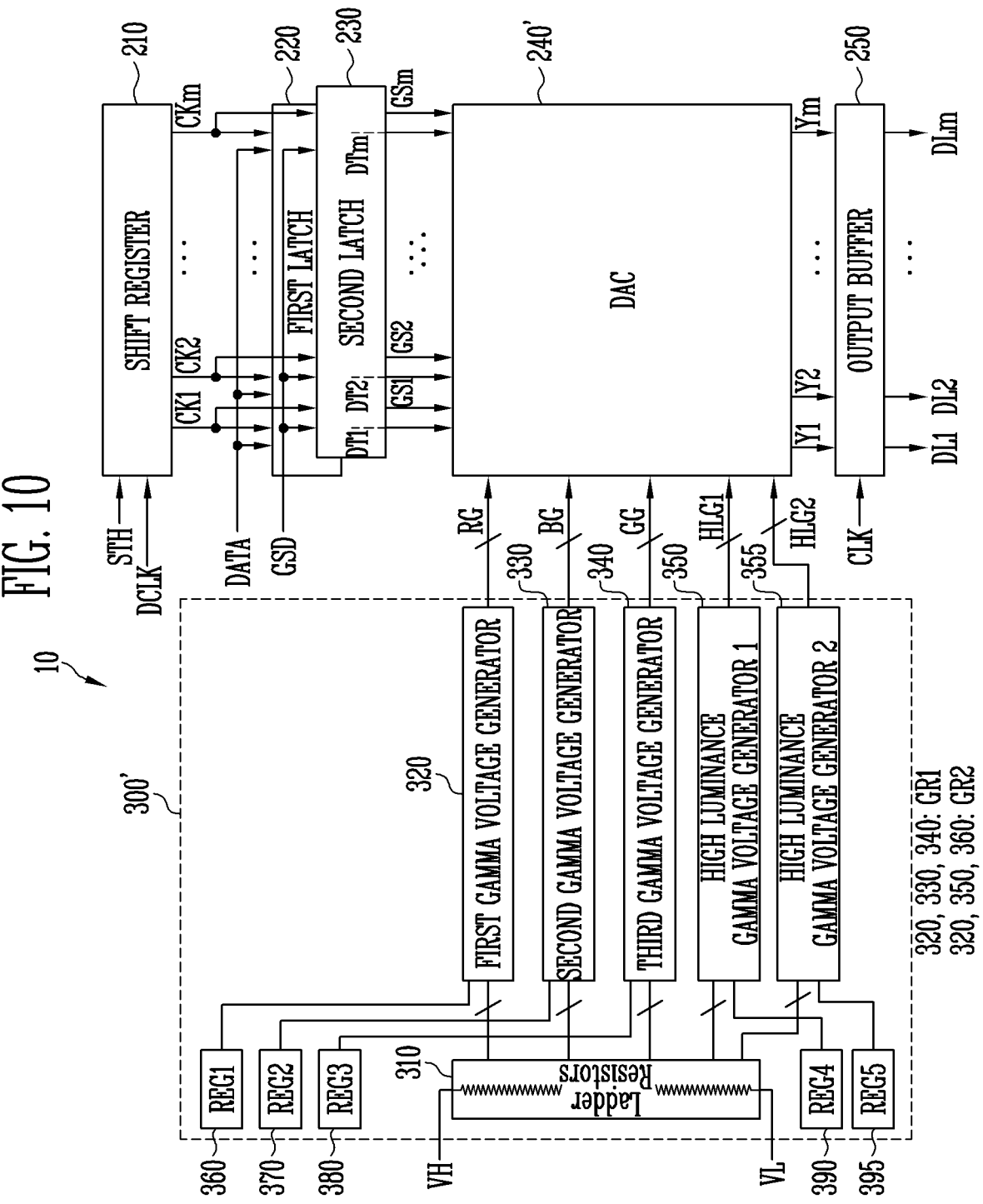
FIG. 10 is a diagram illustrating the data driver and the gamma voltage supply included in the display device of FIG. 1.
Figure 11:
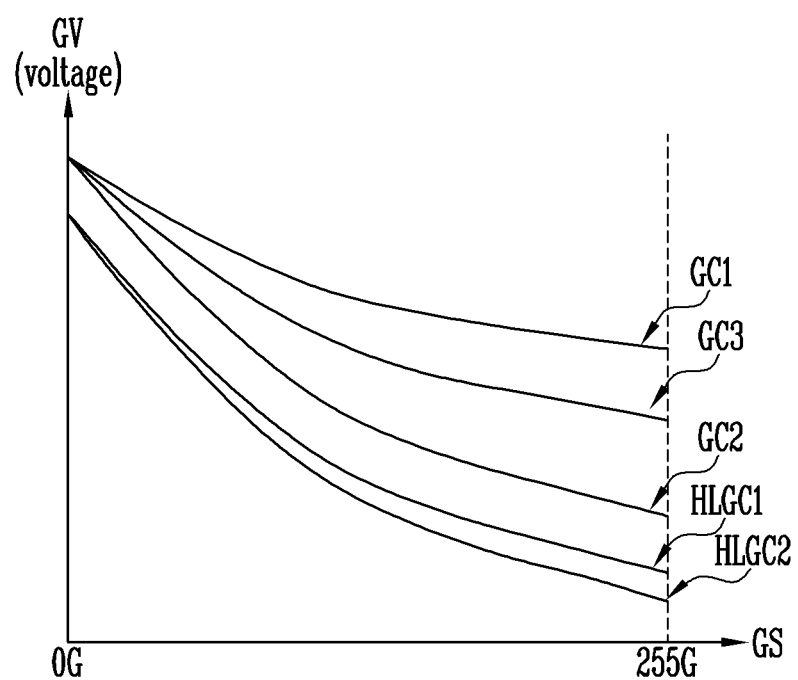
FIG. 11 is a diagram illustrating gamma voltage sets generated by the gamma voltage supply of FIG. 10.

FIG. 10 is a diagram illustrating the data driver and the gamma voltage supply included in the display device of FIG. 1, and FIG. 11 is a diagram illustrating gamma voltage sets generated by the gamma voltage supply of FIG. 10.

In FIG. 10, the same reference numerals are used for the components described with reference to FIG. 3, and repetitive description of such components will be omitted.

Referring to FIGS. 1, 10, and 11, the data driver 200 and the gamma voltage supply part 300' may be included in the driving chip 10.

The gamma voltage supply 300' may include the first to third gamma voltage generators 320, 330, and 340 that generate the first to third gamma voltage sets RG, BG, and GG, respectively. The first to third gamma voltage sets RG, BG, and GG may include the red gamma voltages, the blue gamma voltages, and the green gamma voltages, respectively.

The gamma voltage supply 300' may include first and second high luminance gamma voltage generators 350 and 355 that generate first and second high luminance gamma voltage sets HLG1 and HLG2, respectively.

The first high luminance gamma voltage generator 350 may generate the first high luminance gamma voltage set HLG1 corresponding to one of the plurality of gamma curves stored in the fourth register 390. In an embodiment, the first high luminance gamma voltage set HLG1 may include green gamma voltages.

The first high luminance gamma voltage generator 350 may replace the operation of the third gamma voltage generator 340 with respect to the second area DA2. Therefore, in the second mode, the data signals supplied to the green pixels of the second area DA2 may be generated based on the first high luminance gamma voltage set HLG1.

The second high luminance gamma voltage generator 355 may generate the second high luminance gamma voltage set HLG2 corresponding to one of the plurality of gamma curves stored in a fifth register 395. In an embodiment, the second high luminance gamma voltage set HLG2 may include the blue gamma voltages.

The second high luminance gamma voltage generator 355 may replace the operation of the second gamma voltage generator 330 with respect to the second area DA2. Therefore, in the second mode, the data signals supplied to the blue pixels of the second area DA2 may be generated based on the second high luminance gamma voltage set HLG2.

In the second mode, a digital-to-analog converter 240' may output the data signals using the first to third gamma voltage sets RG, BG, and GG and the first and second high luminance gamma voltage sets HLG1 and HLG2.

As shown in FIG. 11, the luminance of the corresponding green pixel may be increased by a first high luminance gamma curve HLGC1 corresponding to the first high luminance gamma voltage set HLG1. In addition, the luminance of the corresponding blue pixel may be increased by the second high luminance gamma curve HLGC2 corresponding to the second high luminance gamma voltage set HLG2.

Therefore, since both of the luminance of the green and blue pixels increase in the second area DA2, the luminance of the second area DA2 may be further increased. Thus, the light sensing sensitivity and the accuracy in the second mode may be further improved.

Figure 12:
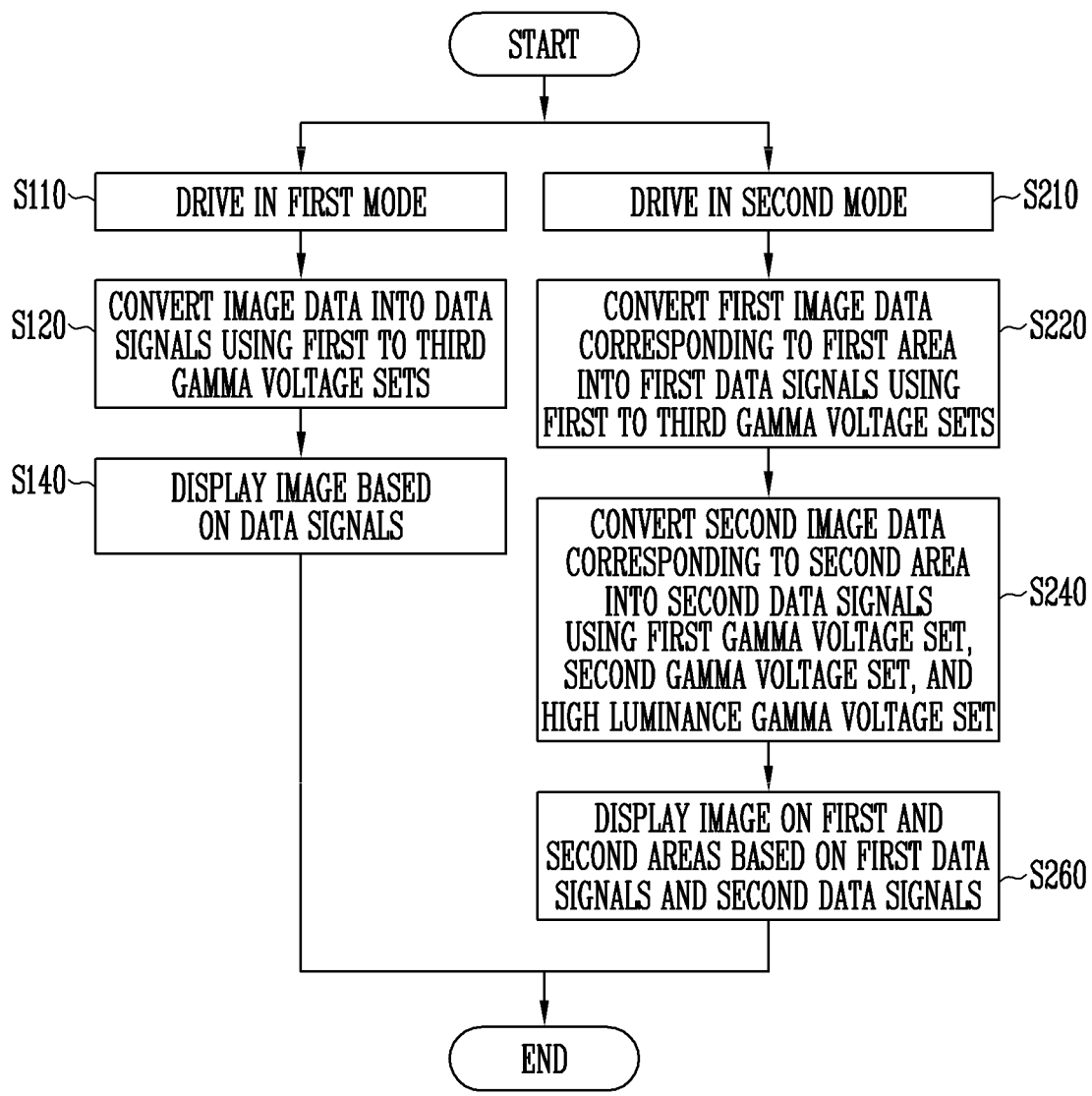
FIG. 12 is a flowchart illustrating a method of driving the display device according to embodiments of the disclosure.

FIG. 12 is a flowchart illustrating a method of driving the display device according to embodiments of the disclosure.

Referring to FIG. 12, the method of driving the display device may convert the image data into the data signal by selectively using a part of the gamma voltage sets according to the driving mode.

In an embodiment, the display device may be driven in the first mode (S110), the image data may be converted into the data signals using the first to third gamma voltage sets in the first mode (S120), and the image may be displayed based on the converted data signals (S140). The first mode may be defined as a mode in which a normal image is displayed.

In an embodiment, the display device may be driven in the second mode (S210), first image data corresponding to the first area may be converted into first data signals using the first to third gamma voltage sets in the second mode (S220), and second image data corresponding to the second area DA2 may be converted into second data signals using the first gamma voltage set, the second gamma voltage set, and the high luminance gamma voltage set (S240). Therefore, an image may be displayed on the first and second areas based on the first and second data signals in the second mode (S260).

Here, the second area corresponds to a portion of the display area, which overlaps the light sensor under the display panel, and in which the light sensing is performed, and the second mode is a mode in which the light sensor is activated for fingerprint recognition or the like.

In addition, in an embodiment, the first to third gamma voltage sets may correspond to the gamma curves of the first to third color light, respectively, and the high luminance gamma voltage set may include a gamma curve of the same color light as the third gamma voltage set. At this time, the luminance of the second area may be higher than that of the first area in the second mode.

As described above, the display device and the method of driving the same according to the embodiments of the disclosure increase the luminance of only the second area corresponding to the light sensor in the second mode, and thus the sensing sensitivity and the accuracy of the light sensor may be further improved. In addition, the gamma of the first area except for the second area is stably maintained in the second mode, and thus the first area may display the image of high quality. Thus, sensing performance of the light sensor may be improved and image quality may be improved together.

Although the above has been described with reference to the embodiments of the disclosure, those skilled in the art may understand, in light of the disclosure, that the disclosure may be variously modified and changed within a range without departing from the spirit and scope of the disclosure disclosed.

What is claimed is:

1. A display device comprising: a display unit comprising a plurality of pixels disposed in a display area, the display area comprising a first area and a second area; a gamma voltage supply including a first gamma voltage generator, a second gamma voltage generator, a third gamma voltage generator, and a first high luminance gamma voltage generator that are configured to generate respective ones of gamma voltage sets; and a data driver configured to convert image data into data signals using the gamma voltage sets, supply the data signals to the pixels, generate the data signals corresponding to the first area and the second area using a first group comprising the first, second and third gamma voltage generators in a first mode, and generate the data signals corresponding to the second area using a second group comprising two of the first, second, and third gamma voltage generators and the high luminance gamma voltage generator and generate data signals corresponding to the first area using the first group in a second mode in which a light sensor disposed on an opposite side of a display is activated.

2. The display device according to claim 1, further comprising:
a light sensor overlapping the second area and disposed on an opposite side of a display surface of the display unit;
a memory configured to store gamma selection data defining the second area and to output the gamma selection data to the data driver in correspondence with activation of the light sensor; and
a controller configured to supply the image data to the data driver and control the memory in correspondence with the activation of the light sensor.

3. The display device according to claim 2, wherein the gamma voltage supply comprises:
a first gamma voltage generator configured to generate a first gamma voltage set of the gamma voltage sets corresponding to first color light;
a second gamma voltage generator configured to generate a second gamma voltage set of the gamma voltage sets corresponding to second color light;
a third gamma voltage generator configured to generate a third gamma voltage set of the gamma voltage sets corresponding to third color light; and
a first high luminance gamma voltage generator configured to generate a first high luminance gamma voltage set corresponding to color light including at least one of the first to third color light.

4. The display device according to claim 3, wherein the first color light, the second color light, and the third color light are red light, blue light, and green light, respectively.

5. The display device according to claim 4, wherein the first high luminance gamma voltage set corresponds to the green light and is applied to the data driver in the second mode.

6. The display device according to claim 5, wherein the second group comprises the second gamma voltage generator, the third gamma voltage generator, and the first high luminance gamma voltage generator.

7. The display device according to claim 4, wherein the gamma voltage supply further comprises:
a second high luminance gamma voltage generator configured to generate a second high luminance gamma voltage set corresponding to the blue light.

8. The display device according to claim 7, wherein the second group comprises the first gamma voltage generator, the first high luminance gamma voltage generator, and the second high luminance gamma voltage generator.

9. The display device according to claim 3, wherein the data driver comprises:
a first latch configured to simultaneously latch the image data and simultaneously output the image data in a horizontal line unit;
a second latch configured to receive the gamma selection data from the memory in the second mode, simultaneously latch the gamma selection data, and output the gamma selection data in the horizontal line unit; and
a digital-analog converter configured to convert the latched image data into the data signals based on the gamma selection data, the first gamma voltage set, the second gamma voltage set, the third gamma voltage set, and the first high luminance gamma voltage set.

10. The display device according to claim 9, wherein the digital-analog converter is configured to select one of the first gamma voltage set and the first high luminance gamma voltage set based on the gamma selection data in the second mode, and output a data signal from the selected one.

11. The display device according to claim 9, wherein, in the second mode, the digital-analog converter converts the latched image data corresponding to the second area into the data signals using the second group, and
in the second mode, the digital-analog converter converts the latched image data corresponding to the first area into the data signals using the first group.

12. The display device according to claim 9, wherein, in the first mode, the digital-analog converter converts the latched image data corresponding to the first area and second area into the data signals using the first group.

13. The display device according to claim 2, wherein the light sensor is deactivated in the first mode and is activated in the second mode, and
wherein a luminance of the second area is higher than a luminance of the first area in the second mode.

14. A method of driving a display device, the method comprising: converting image data corresponding to a first area and a second area of a display area into data signals using a first gamma voltage set, a second gamma voltage set, and a third gamma voltage set in a first mode; displaying an image based on the data signals in a first mode; converting first image data corresponding to a first area of a display area into first data signals using the first gamma voltage set, the second gamma voltage set, and the third gamma voltage set in a second mode in which a light sensor disposed on an opposite side of a display surface is activated; converting second image data corresponding to a second area of the display area into second data signals using the first gamma voltage set, the second gamma voltage set, and a high luminance gamma voltage set in the second mode; and displaying the image based on the first data signals and the second data signals in the second mode.

15. The method according to claim 14, wherein the third gamma voltage set and the high luminance gamma voltage set include gamma voltages for the same color light, and
a luminance of the second area is higher than a luminance of the first area in the second mode.

16. A driving chip comprising: a gamma voltage supply comprising a first gamma voltage generator, a second gamma voltage generator, a third gamma voltage generator, and a first high luminance gamma voltage generator that generate respective ones of gamma voltage sets; and a data driver configured to convert image data into data signals using the gamma voltage sets, wherein, in the first mode, the data driver generates the data signals corresponding to a first area and second area included in a display area using a first group comprising the first, second and third gamma voltage generators, and in a second mode in which a light sensor disposed on an opposite side of a display is activated, the data driver generates the data signals corresponding to the second area using the second group comprising two of the first, second and third gamma voltage generators and the high luminance gamma voltage generator, and generates the data signals corresponding to the first area using the first group.

17. The driving chip according to claim 16, wherein the gamma voltage supply comprises:
a first gamma voltage generator of the gamma voltage generators configured to generate a first gamma voltage set corresponding to first color light;
a second gamma voltage generator of the gamma voltage generators configured to generate a second gamma voltage set corresponding to second color light;
a third gamma voltage generator of the gamma voltage generators configured to generate a third gamma voltage set corresponding to third color light; and
a first high luminance gamma voltage generator configured to generate a high luminance gamma voltage set corresponding to one of the first to third color light,
the first group includes the first gamma voltage generator, the second gamma voltage generator, and the third gamma voltage generator, and
the second group includes the high luminance gamma voltage generator and gamma voltage generators that do not correspond to the color light of the high luminance gamma voltage set among the first gamma voltage generator, the second gamma voltage generator, and the third gamma voltage generator.

* * * * *